UNITED STATES PATENT OFFICE.

SAGER CHADWICK, OF PHILADELPHIA, PENNSYLVANIA.

PROCESS OF TAWING LEATHER.

SPECIFICATION forming part of Letters Patent No. 561,044, dated May 26, 1896.

Application filed August 28, 1891. Serial No. 403,993. (No specimens.)

*To all whom it may concern:*

Be it known that I, SAGER CHADWICK, of Philadelphia, (Frankford,) in the county of Philadelphia, and in the State of Pennsylvania, have invented certain new and useful Improvements in the Production of Leather; and I do hereby declare that the following is a full, clear, and exact description thereof.

In the tanning of skins the nearly universal practice has been and still is to effect the curing result by means of tannic acid, but as the principal source of such agent is the bark of certain kinds of trees, and as it has yearly become more difficult to procure the same, the expense involved by the curing process has from such cause steadily increased.

The object of my invention is to lessen the expense of tanning skins and also to materially shorten the time required for the process, to which end said invention consists, broadly, in the process of tanning skins by immersing the same alternately in solutions of chromic acid and sulfate of iron with the combination therewith of acetic acid, substantially as and for the purpose hereinafter specified.

In the carrying of my invention into practice the skin is prepared in the usual manner for the tanning process and is then immersed in a solution composed of chromic acid and water in the proportion of ten (10) grains of acid to one (1) ounce of water, in which it is permitted to remain until thoroughly saturated—from a few hours to about six days, dependent upon the thickness of the skin. Upon being removed from the acid solution the skin is immersed in a solution of sulfate of iron and water in the proportion of one (1) part of sulfate of iron to nine (9) parts of water, in which, as before, it must remain from a few hours to several days, dependent upon the thickness of the skin. After such treatment the skin is washed and dried in the usual manner. With either or both of the solutions I combine acetic acid in the proportion of one (1) part of acid to sixteen (16) parts of solution; but in place of such acid any chemical equivalent may be employed, if desired. For instance, I contemplate using, instead of pure acetic acid, either vinegar or pyroligneous acid. As indicated hereinafter, I find either of these to be capable of successful use in carrying out my process, though I prefer acetic acid in its pure form. While I preferably employ the solutions in the order named and compound them in the proportions described, such order may be reversed. Any desired variation may be made in the relative proportions of the ingredients.

I do not confine myself to the use of chromic acid or sulfate of iron in the carrying out of my process, as any of the salts or other known chemical equivalents of such articles may be employed in their stead. Some of the chrome-salts which can be so used in my process are bichromate of soda, bichromate of potash, and bichromate of ammonia, though I prefer the first named. Instead of the sulfate of iron I contemplate using, where desired, a protosulfate or other iron-salt, while the sulfate has been found to be the best. The acetic acid used can be in the pure form or as contained in vinegar or pyroligneous acid, which last I have found to work well and be advantageous on account of its cheapness.

The use of acetic acid I have found to be a most essential thing in the successful carrying out of my process to produce good durable uniformly-tanned leather. Without the acid, which, as I have described, can be used in connection with either of the alternate baths, if the hides or skins are simply immersed in the chromic-acid bath and then in the sulfate-of-iron one, I have found by actual practice that the iron-salt fails to penetrate them properly, and the result is a crusty deposit on the hides or skins, a brittle condition of the outer portions of the latter, and a raw and improperly-tanned condition of their interior portions. With the acetic acid used as specified the penetration of both the chromic acid and iron-salt throughout the hides or skins is most perfect and uniform, and the result is a fine tough thoroughly and uniformly tanned article of leather.

Having thus described my invention, what I claim is—

1. The process of tanning skins which consists in soaking the same alternately in a solution of chromic acid or compound adapted to produce such acid, and one of iron-salt, and subjecting them to the action of acetic acid also in solution, substantially as and for the purpose specified.

2. The process of tanning skins which consists in soaking them alternately in a solution of chromic acid and a solution of sulfate of iron, and subjecting them to the action of a solution of acetic acid substantially as and for the purpose set forth.

3. The process of tanning skins which consists in soaking them alternately in a solution containing chromic acid and one containing sulfate of iron either of which contains acetic acid, substantially as and for the purpose described.

In testimony that I claim the foregoing I have hereunto set my hand this 27th day of August, 1891.

SAGER CHADWICK.

Witnesses:
 HENRY C. HAZARD,
 JAS. E. HUTCHINSON.